(12) United States Patent
Guichard et al.

(10) Patent No.: US 9,513,388 B2
(45) Date of Patent: Dec. 6, 2016

(54) METHOD FOR PROVIDING SYNCHRONIZATION IN A DATA ACQUISITION SYSTEM

(71) Applicant: SERCEL, Carquefou (FR)

(72) Inventors: Florent Guichard, Nantes (FR); Gwenael Housin, Nantes (FR); Sophie Lostanlen-Nouy, Nantes (FR); Fabien Le Moine, Bain de Bretagne (FR)

(73) Assignee: SERCEL, Carquefou (FR)

( * ) Notice: Subject to any disclaimer, the term of this patent is extended or adjusted under 35 U.S.C. 154(b) by 139 days.

(21) Appl. No.: 14/333,118

(22) Filed: Jul. 16, 2014

(65) Prior Publication Data

US 2015/0260864 A1 Sep. 17, 2015

Related U.S. Application Data

(60) Provisional application No. 61/951,885, filed on Mar. 12, 2014.

(51) Int. Cl.
*E21B 47/14* (2006.01)
*G01V 1/22* (2006.01)
*G01V 1/26* (2006.01)

(52) U.S. Cl.
CPC ............... *G01V 1/223* (2013.01); *G01V 1/26* (2013.01); *G01V 2200/12* (2013.01)

(58) Field of Classification Search
CPC ..................................................... G01V 1/223
(Continued)

(56) References Cited

U.S. PATENT DOCUMENTS 6,236,665 B1 * 5/2001 Kanzaki ............... H04J 3/0688
370/503
7,711,535 B1 * 5/2010 Brookes .............. G06F 17/5022
703/14
(Continued)

FOREIGN PATENT DOCUMENTS

WO 2005029131 A2 3/2005

OTHER PUBLICATIONS

European Search Report and Written Opinion dated Apr. 11, 2016 for European Patent Application No. 15155873 filed Feb. 20, 2015.
(Continued)

*Primary Examiner* — Santiago Garcia
(74) *Attorney, Agent, or Firm* — David D. Brush; Westman, Champlin & Koehler, P.A.

(57) ABSTRACT

It is proposed a method for providing synchronization in a data acquisition system including a plurality of acquisition units. A given acquisition unit of the plurality carries out the following steps: receiving a packet from another device of the data acquisition system; extracting a synchronization accuracy information and a reference clock information from the received packet; obtaining a first reference clock as a function of the extracted reference clock information; if the extracted synchronization accuracy information indicates a better synchronization accuracy than a current synchronization accuracy information associated to the given acquisition unit: taking the obtained first reference clock as a selected reference clock and updating the current synchronization accuracy information to indicate a lower synchronization accuracy than the extracted synchronization accuracy information.

13 Claims, 5 Drawing Sheets

(58) Field of Classification Search
USPC .......................................................... 367/81
See application file for complete search history.

(56) References Cited

U.S. PATENT DOCUMENTS

| | | | | | |
|---|---|---|---|---|---|
| 8,228,747 | B2* | 7/2012 | Onishi | ................. | G11C 7/1066 365/191 |
| 8,228,757 | B2 | 7/2012 | Beffa et al. | | |
| 8,572,532 | B1* | 10/2013 | Singh | ................. | G06F 17/505 716/107 |
| 8,635,041 | B2* | 1/2014 | Golparian | ................. | G01V 1/22 367/51 |
| 2003/0133474 | A1* | 7/2003 | Chang | ................. | H04J 3/0685 370/512 |
| 2004/0085082 | A1* | 5/2004 | Townley | .......... | G01R 31/31922 324/762.01 |
| 2004/0150660 | A1* | 8/2004 | Abe | .................... | G09G 3/2081 345/691 |
| 2005/0047275 | A1* | 3/2005 | Chamberlain | ........... | G01V 1/26 367/56 |
| 2006/0245453 | A1* | 11/2006 | Bedrosian | ............. | H04J 3/0658 370/503 |
| 2010/0054232 | A1* | 3/2010 | Asano | .................... | H04L 69/28 370/349 |
| 2010/0318299 | A1 | 12/2010 | Golparian et al. | | |
| 2012/0042193 | A1* | 2/2012 | Gupta | ....................... | G06F 1/08 713/501 |
| 2012/0306558 | A1* | 12/2012 | Singvall | ................... | H03K 3/02 327/298 |
| 2014/0167825 | A1* | 6/2014 | Dobbs | ...................... | G06F 1/12 327/158 |
| 2014/0334831 | A1* | 11/2014 | Kawazoe | ............. | H04B 10/693 398/210 |
| 2015/0222276 | A1* | 8/2015 | Milijevic | ............... | H03L 7/087 327/147 |

OTHER PUBLICATIONS

Mexican Office Action and English Summary dated Jul. 12, 2016 for Mexican Patent Application No. MX/a/2015/003137.

* cited by examiner

METHOD FOR PROVIDING SYNCHRONIZATION IN A DATA ACQUISITION SYSTEM

1. CROSS-REFERENCE TO RELATED APPLICATIONS

This application is based on and claims priority from U.S. Provisional Application No. 61/951,885, filed Mar. 12, 2014, the content of which is hereby incorporated by reference in its entirety.

2. FIELD OF THE DISCLOSURE

The field of the disclosure is that of data acquisition systems comprising a plurality of acquisition units.

More specifically, the disclosure pertains to a technique for providing synchronization in such a data acquisition system.

The disclosure can be applied notably to the synchronization of seismic acquisition units belonging to a multi-hop network in a seismic data acquisition system, but can be of interest for any other field requiring synchronization of acquisition units.

In a particular embodiment, the multi-hop network is a wireless network and each acquisition unit is a wireless device adapted to receive and transmit packets through a radio transceiver. But in an alternative embodiment the multi-hop network can be a cabled network.

3. TECHNOLOGICAL BACKGROUND

It is sought more particularly here below in this document to describe problems existing in a wireless seismic data acquisition system. The present disclosure of course is not limited to this particular application but is of interest for any technique for providing synchronization in a data acquisition system that has to cope with closely related or similar issues and problems.

A first known solution is described in U.S. Pat. No. 8,228,757B2, entitled "Synchronization of modules in a wireless array". This document discloses a method for synchronizing a wireless data acquisition module in a seismic array. The method comprises:
  receiving at the wireless data acquisition module a time reference event from a separate component of the seismic array (as shown in FIG. 3 of this document, the time reference event provides a reference clock, coming either from a GPS receiver connected to the wireless data acquisition module, or from a radio event);
  determining a delay value associated with the received time reference event, wherein the delay value includes a transmission delay associated with transmission of the time reference event from the separate component to the wireless data acquisition module; and
  adjusting a system clock of the wireless data acquisition module, based on the delay value, to synchronize the system clock in relation to the time reference event (i.e. the reference clock).

In a particular embodiment described in this document, the GPS receiver is powered on at a first instance, in order to discipline the system clock of the wireless data acquisition module to the GPS time signal received (and relating to a first reference clock), and subsequently powered off. Subsequently, the system clock control of the wireless data acquisition module employ time reference events received from radio events (and relating to a second reference clock) to continue to discipline the system clock, such that the GPS receiver may remain powered down to conserve battery capacity.

The adjusted clock of a first wireless data acquisition module may be used to generate an outgoing reference signal (above second reference clock) that is then broadcast to a second wireless data acquisition module which may in turn perform a corresponding process to the one described above. This allows to propagate time reference events throughout the system such that all wireless data acquisition modules within the system have synchronous clocks.

A second known solution is described in WO2005029131A2, entitled "Single station wireless seismic data acquisition method and apparatus". In one embodiment, the wireless acquisition unit (also referred to as "wireless sensor station") includes a GPS receiver and associated antenna. The GPS receiver in this embodiment is shown coupled to a processor and a clock circuit to provide location parameters for correlating seismic information and for synchronizing data acquisition. Alternatively, location parameters can be transmitted to and stored in a central controller and synchronization may be accomplished by sending signals over a VHF/UHF radio link independent of the GPS.

A third known solution is described in US20050047275A1, entitled "Synchronization and positioning of seismic data acquisition systems". To facilitate solution of the synchronization problem, a network master clock and one or more additional high precision clocks are added to the network of wireless acquisition units (also referred to as "remote acquisition modules (RAMs)"). Synchronization of the network is done in two stages, first synchronization of the high precision clocks throughout the network, and subsequently, synchronization of the remainder of the clocks. The high precision clocks can be located internally or externally to the remote acquisition modules (RAMs) and Line tap units (LTUs). In a particular embodiment, the high precision clock possesses an oscillator of lower precision, such as 0.5 PPM, but in this case the high precision clock module relies on the GPS receiver or radio beacon signals to attain high precision. In this particular embodiment, the highly precise GPS time signals or radio beacon signals are used to continually correct the drift of the less precise clock, and in this way the high precision clock module does achieve high precision. There are two types of remote acquisition modules: those with and those without a high precision clock module. Three different mechanisms to synchronize the high precision clock are described: 1) synchronizing before deployment, 2) synchronizing after deployment through direct transmission, and 3) synchronizing after deployment through repeated synchronization transmissions. For the remote acquisition modules without a high precision clock module, they are synchronized to the remote acquisition modules with a high precision clock module: each remote acquisition module receives the synchronization signal from a neighboring remote acquisition module one physical side and rebroadcasts the synchronization signal to another neighboring remote acquisition module on its other physical side. In this way, the synchronizing signal travels to all the remote acquisition modules connected to the network. When a remote acquisition module with a high precision clock receives the synchronizing signal, it corrects it before rebroadcasting it.

However, none of the aforesaid first, second and third known solutions addresses the problem of the choice of the clock source (i.e. of the reference clock) when a given data acquisition module can receive signals from several reference clocks, e.g.:

signals from a receiver (GNSS receiver or synchronization beacon receiver) comprised in or connected to the given data acquisition module, and/or     signals from one or several other data acquisition modules (as is the case notably in a wireless multi-hop network).

This problem is critical because conditions vary over time and the given data acquisition module does not always receive the same reference clocks. For example, a GNSS receiver can have no fix because of harsh environment, and therefore it can not provide GNSS time signals to the given data acquisition module.

This problem is critical also because there is a need, in a data acquisition system (notably a wireless seismic data acquisition system) based on e.g. 50 acquisition modules or more, for several Master Clocks. A Master Clock is defined as an acquisition module, synchronized by its internal GNSS receiver (or its synchronization beacon receiver), and providing time references to other acquisition modules in the system.

4. SUMMARY

A particular embodiment of the disclosure proposes a method for providing synchronization in a data acquisition system comprising a plurality of acquisition units, characterized in that a given acquisition unit of said plurality carries out the following steps:

receiving a packet from another device of the data acquisition system;

extracting a synchronization accuracy information and a reference clock information from the received packet;

obtaining a first reference clock as a function of the extracted reference clock information;

if the extracted synchronization accuracy information indicates a better synchronization accuracy than a current synchronization accuracy information associated to said given acquisition unit:

taking the obtained first reference clock as a selected reference clock; and         updating the current synchronization accuracy information to indicate a lower synchronization accuracy than the extracted synchronization accuracy information.

The general principle is that of a distributed self-configuration mechanism: the given acquisition unit selects itself (without need of a gateway or a central unit) and dynamically a reference clock, depending on a comparison between the extracted synchronization accuracy information and the current synchronization accuracy information. Thus the given acquisition unit easily chooses a reference clock, even though there are several possible reference clocks. One or several reference clocks can be received by the given acquisition unit via packets coming from one or several clock sources.

According to a particular feature, if the extracted synchronization accuracy information does not indicate a better synchronization accuracy than the current synchronization accuracy information, said given acquisition unit keeps a previous selected reference clock.

Thus the selected reference clock is always the best one.

According to a particular feature, said given acquisition unit carries out the following steps:

receiving, from a receiver comprised in or connected to said given acquisition unit, a second reference clock;

taking the second reference clock as the selected reference clock; and     updating the current synchronization accuracy information to indicate a maximal synchronization accuracy.

Thus one of the possible reference clocks (among which is carried out the aforesaid distributed self-configuration mechanism) is a "local reference clock", i.e. a reference clock coming from a receiver comprised in or connected to the given acquisition unit. When this "local reference clock" is available, it is chosen since it is a very accurate clock.

According to a particular feature, said receiver is a wireless receiver belonging to the group consisting of a satellite navigation system receiver and a synchronization beacon receiver.

This list is not exhaustive. Other receivers allowing to obtain a very accurate clock can be used.

According to a particular feature, said given acquisition unit carries out the following step: updating the current synchronization accuracy information, by degrading it, if it has not been updated for a predetermined period of time.

Thus, the aforesaid distributed self-configuration mechanism takes into account the evolution in time of the current synchronization accuracy information (decreasing accuracy when no updating).

According to a particular feature, said given acquisition unit carries out the following supplemental step: providing the selected reference clock to a data acquisition block comprised in said given acquisition unit.

Thus the data acquisition block is synchronized with the selected reference clock.

According to a particular feature, said another device, from which said given acquisition unit receives the packet, is another acquisition unit of said plurality or a base station.

Thus, via the received packets, the given acquisition unit can receive reference clocks from different synchronization sources (i.e. different devices of the acquisition system).

According to a particular feature, said given acquisition unit carries out the following supplemental step:

inserting in a packet to be transmitted, the updated current synchronization accuracy information and a reference clock information relating to the selected reference clock.

Thus the given acquisition unit can act as a "Master clock" for one or several other acquisition units which receive packets sent by the given acquisition unit, provided that the synchronization accuracy information sent by the given acquisition unit indicates a better synchronization accuracy than a current synchronization accuracy information associated to the one or several other acquisition units.

According to a particular feature, the updated current synchronization accuracy information, inserted in the packet to be transmitted, depends on at least one parameter belonging to the group consisting of:

a number of hops the packet has taken from an initial sending by a master clock source device till a resending by said given acquisition unit, within a multi-hop network comprising said master clock source device and said given acquisition unit;

a current synchronization accuracy information associated to said another device from which said given acquisition unit has previously received said packet;

radio characteristics of said packet received from said another device by said given acquisition unit; and     a duration since a last previous packet received from said another device by said given acquisition unit.

This list is not exhaustive. One or several of these parameters can be combined.

In a particular implementation, said given acquisition unit is a device belonging to a multi-hop network comprising said plurality of acquisition units.

In a particular implementation, said given acquisition unit is a wireless device adapted to receive and transmit packets through a radio transceiver.

In a particular implementation, said plurality of acquisition units is a plurality of seismic acquisition units and said data acquisition system is a seismic data acquisition system.

In another embodiment, the disclosure pertains to a computer program product comprising program code instructions for implementing the above-mentioned method (in any of its different embodiments) when said program is executed on a computer or a processor.

In another embodiment, the disclosure pertains to a non-transitory computer-readable carrier medium, storing a program which, when executed by a computer or a processor causes the computer or the processor to carry out the above-mentioned method (in any of its different embodiments).

In another embodiment, the disclosure pertains to an acquisition unit comprising:
- means for receiving a packet from another device of the data acquisition system;
- means for extracting a synchronization accuracy information and a reference clock information from the received packet;
- means for obtaining a first reference clock as a function of the extracted reference clock information;
- the following means, activated if the extracted synchronization accuracy information indicates a better synchronization accuracy than a current synchronization accuracy information associated to said given acquisition unit:
  - means for taking the obtained first reference clock as a selected reference clock; and
  - means for updating the current synchronization accuracy information to indicate a lower synchronization accuracy than the extracted synchronization accuracy information.

Advantageously, the acquisition unit comprises means for implementing the steps it performs in the method described above, in any of its various embodiments.

5. LIST OF FIGURES

Other features and advantages of embodiments of the disclosure shall appear from the following description, given by way of an indicative and non-exhaustive examples and from the appended drawings, of which.

6. DETAILED DESCRIPTION

In all of the figures of the present document, similar elements and steps are designated by the same numerical reference sign.

In the following description we consider, for illustrative purposes only, the case of a wireless seismic acquisition unit belonging to a wireless multi-hop network in a wireless seismic data acquisition system. As already mentioned above, the present disclosure is not limited to this particular case but can be of interest for any technical field (not only seismic field) requiring synchronization of acquisition units (wired or wireless).

Figure 1:
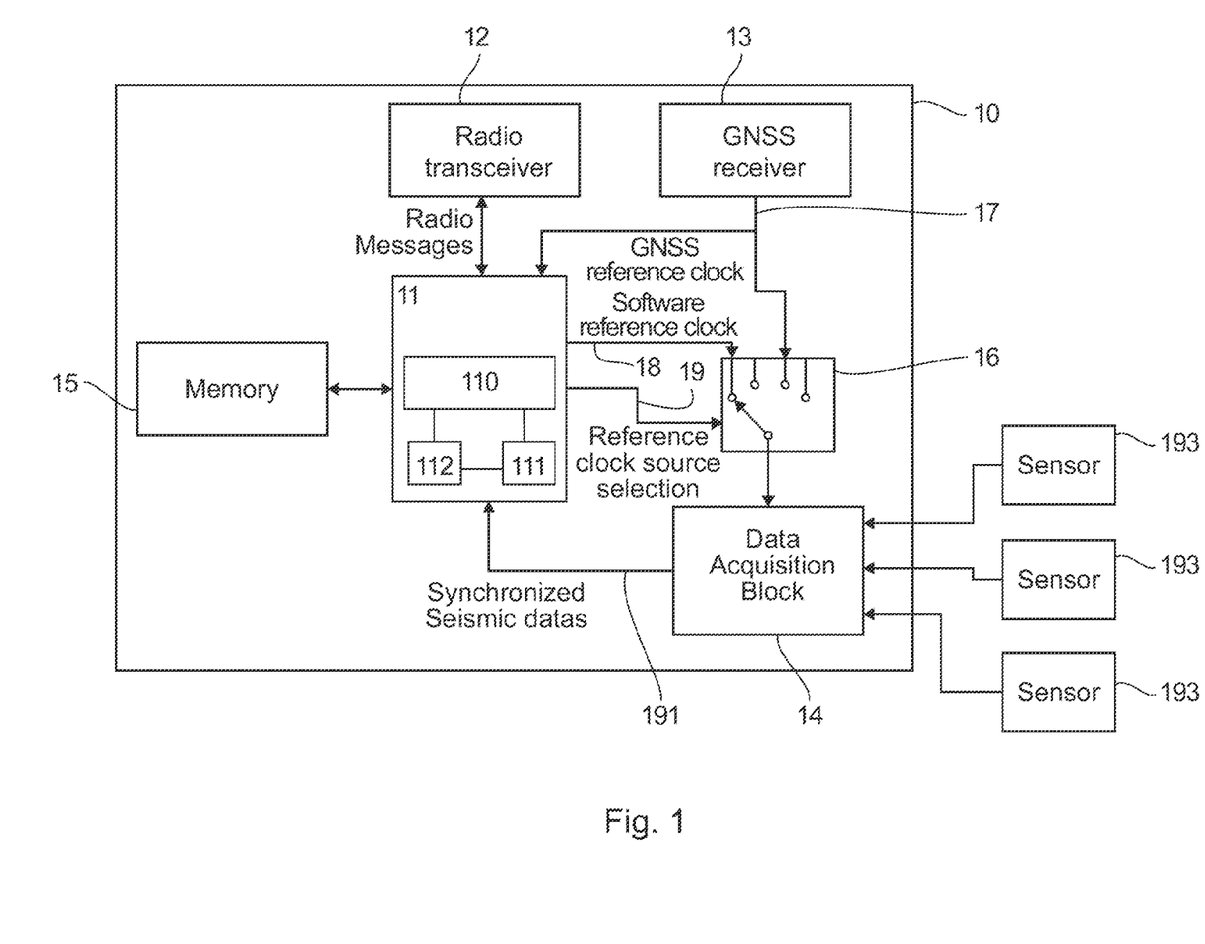
FIG. 1 is a block diagram showing the simplified structure of a wireless seismic acquisition unit according to a particular embodiment of the disclosure.

In the particular embodiment of the disclosure shown in FIG. 1, the wireless seismic acquisition unit 10 comprises: a controller 11, a radio transceiver 12, a GNSS ("Global Navigation Satellite System") receiver 13, a data acquisition block 14, a memory 15 and a switching block 16.

The GNSS receiver 13 provides a first reference clock 17, referred to as "GNSS reference clock", to the controller 11 and to the switching block 16. In an alternative embodiment, the GNSS receiver 13 is replaced by a synchronization beacon receiver.

The reference clock may be:
- a continuous clock or
- a burst clock (if the application does not need a continuous clock, the burst clock is a means to reduce the power consumption when this feature is critical).

The controller 11 manages the different blocks of the wireless seismic acquisition unit 10:
- it monitors the states of the GNSS receiver 13 and receives the GNSS reference clock 17;
- it manages the radio transceiver 12, in order to receive and transmit radio messages;
- it provides a second reference clock 18, referred to as "software reference clock", based on the radio messages received via the radio transceiver 12;
- it manages the switching block 16, with a selection signal 19 (referred to as "Reference clock source selection"), in order to select one of the two signals received by the switching block 16 (namely the GNSS reference clock 17 and the software reference clock 18). The selected reference clock 192 is provided to the data acquisition block 14;
- it stores in the memory 15 the synchronized seismic data 191 outputted by the data acquisition block 14.

The data acquisition block 14 samples one or several input channels (each connected to one or several seismic sensors 193), then it applies an interpolation filter according to the phase of the selected reference clock 192. In other words, the data acquisition block 14 is synchronized to the selected reference clock, i.e. either the GNSS reference clock 17 (generated by the GNSS receiver 13) or the software reference clock 18 (generated by the controller 11 based on messages received from other devices). The data acquisition block 14 outputs the synchronized seismic data 191 which are provided to the processor 11. In an alternative embodiment, the sensors 193 are integrated in the wireless seismic acquisition unit 10.

The radio transceiver 12 communicates, i.e. exchange messages (also referred to as packets) with other devices of the wireless multi-hop network, e.g. with a base-station or with one or several adjacent wireless seismic acquisition units.

Figure 7:
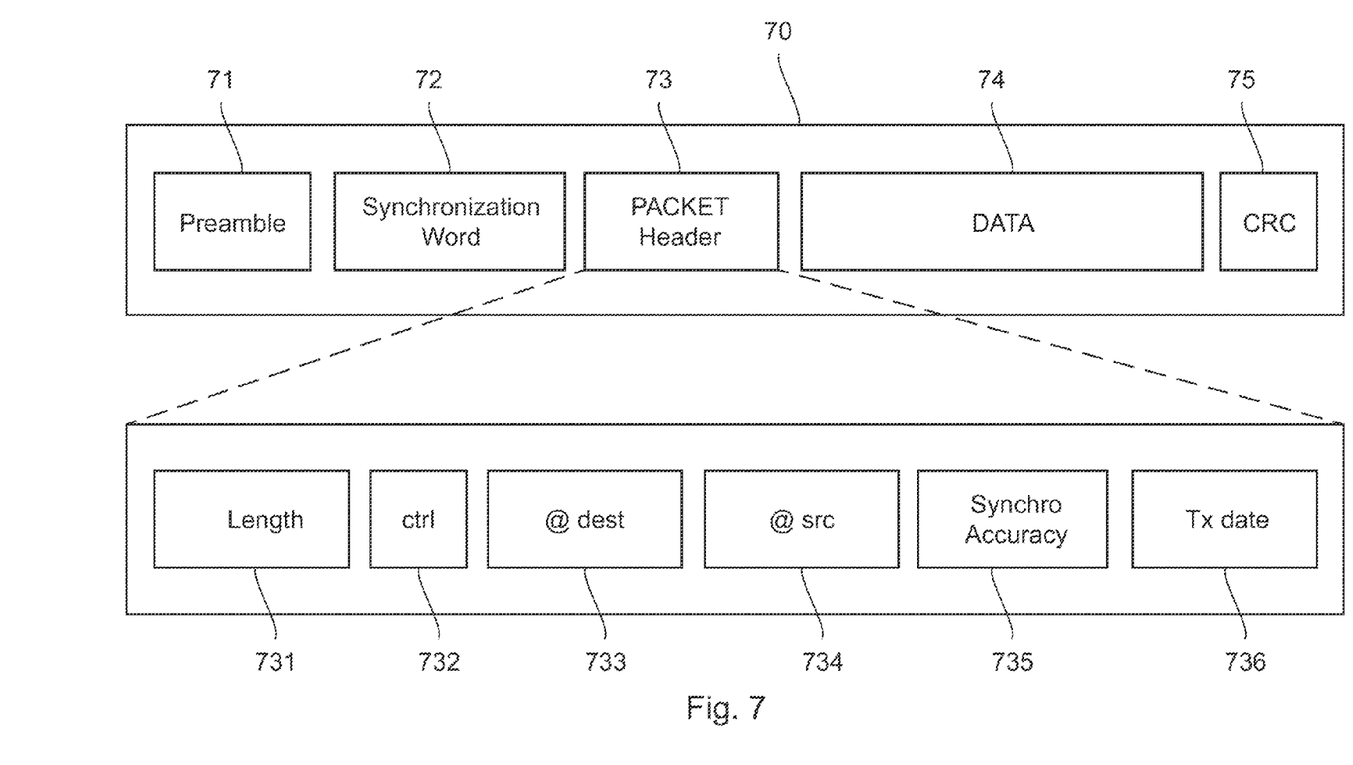
FIG. 7 shows the structure of a message (or packet) in a particular embodiment of the disclosure.

FIG. 7 shows the structure of a message (or packet) 70 in a particular embodiment of the disclosure. The message comprises a preamble 71, a synchronization word 72, a packet header 73, data 74 and a CRC ("Cyclic Redundancy Check") field 75.

The packet header 73 comprises a length field 731, a control ("ctrl") field 732, a destination address ("@ dest") field 733, a source address ("@ src") field 734, a synchronization accuracy ("Synchro Accuracy") field 735 and a transmission date ("Tx Date") field 736.

In a particular embodiment, the "Synchro Accuracy" field 735 of a message (or packet) sent by a given wireless seismic acquisition unit, contains the number of hops this message has taken from an initial sending by a master clock source device till a resending by the given acquisition unit, within the wireless multi-hop network. The master clock source device is for example a base station or another wireless seismic acquisition unit, which comprises a GNSS receiver having a fix, i.e. able to provide a precise GNSS time value. This particular embodiment is illustrated below, with reference to FIGS. 3A to 3C.

In alternative embodiments, the "Synchro Accuracy" field 735 of a message (or packet) sent by a given wireless seismic acquisition unit depends on one or several of the following parameters (in combination or not with the previously described parameter, i.e. the number of hops):

- a current synchronization accuracy information associated to another device (e.g. a base station or another wireless seismic acquisition unit) from which the given wireless seismic acquisition unit has previously received the message (or packet);
- radio characteristics (e.g. bitrate, modulation, signal-to-noise, . . . ) of the message (or packet) received from the aforesaid another device by the given wireless seismic acquisition unit; and
- a duration since a last previous message (or packet) received from the aforesaid another device by the given wireless seismic acquisition unit.

Returning to FIG. 1, when a message (or packet) is received, the radio transceiver 12 provides it to the controller 11, with a time-pulse synchronous to the end of the synchronization word 72 of this message. The "Tx Date" field 736 of this message is extracted and processed by the controller 11, with radio characteristics, to determine a time value. From this determined time value, the controller 11 is able to provide internally the "software reference clock" 18. The "Synchro Accuracy" field 735 of this message is also extracted and used by the controller 11 as an input parameter in the algorithms described hereinafter with reference to FIGS. 2 to 5.

When a message is to be transmitted, the controller 11 provides it to the radio transceiver 12 and the radio transceiver 12 provides a time-pulse synchronous to the beginning of the synchronization word 72 of this message. The "Tx Date" field 736 of this message is filled with a time value provided by the selected reference clock 192 (i.e. with a reference clock information). The "Synchro Accuracy" field 735 of this message is filled with a current synchronization accuracy information, resulting from the execution of the algorithms described hereinafter with reference to FIGS. 2 to 5.

The controller 11 comprises a non-volatile memory 111 (e.g. a read-only memory (ROM) or a hard disk), a volatile memory 112 (e.g. a random access memory or RAM) and a processor 110. The non-volatile memory 111 is a non-transitory computer-readable carrier medium. It stores executable program code instructions, which are executed by the processor 110 in order to enable implementation of the synchronization method described below (algorithms described hereinafter with reference to FIGS. 2 to 5). Upon initialization, the aforementioned program code instructions are transferred from the non-volatile memory 111 to the volatile memory 112 so as to be executed by the processor 110. The volatile memory 112 likewise includes registers for storing the variables and parameters required for this execution.

All the steps of the synchronization method can be implemented equally well:

- by the execution of a set of program code instructions executed by a reprogrammable computing machine such as a PC type device, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the present disclosure is not limited to a purely software-based implementation, in the form of computer program instructions, but it can also be implemented in hardware form or any form combining a hardware portion and a software portion.

FIGS. 2 to 5 are flowcharts of a particular embodiment of the synchronization method according to the disclosure.

Figure 2:
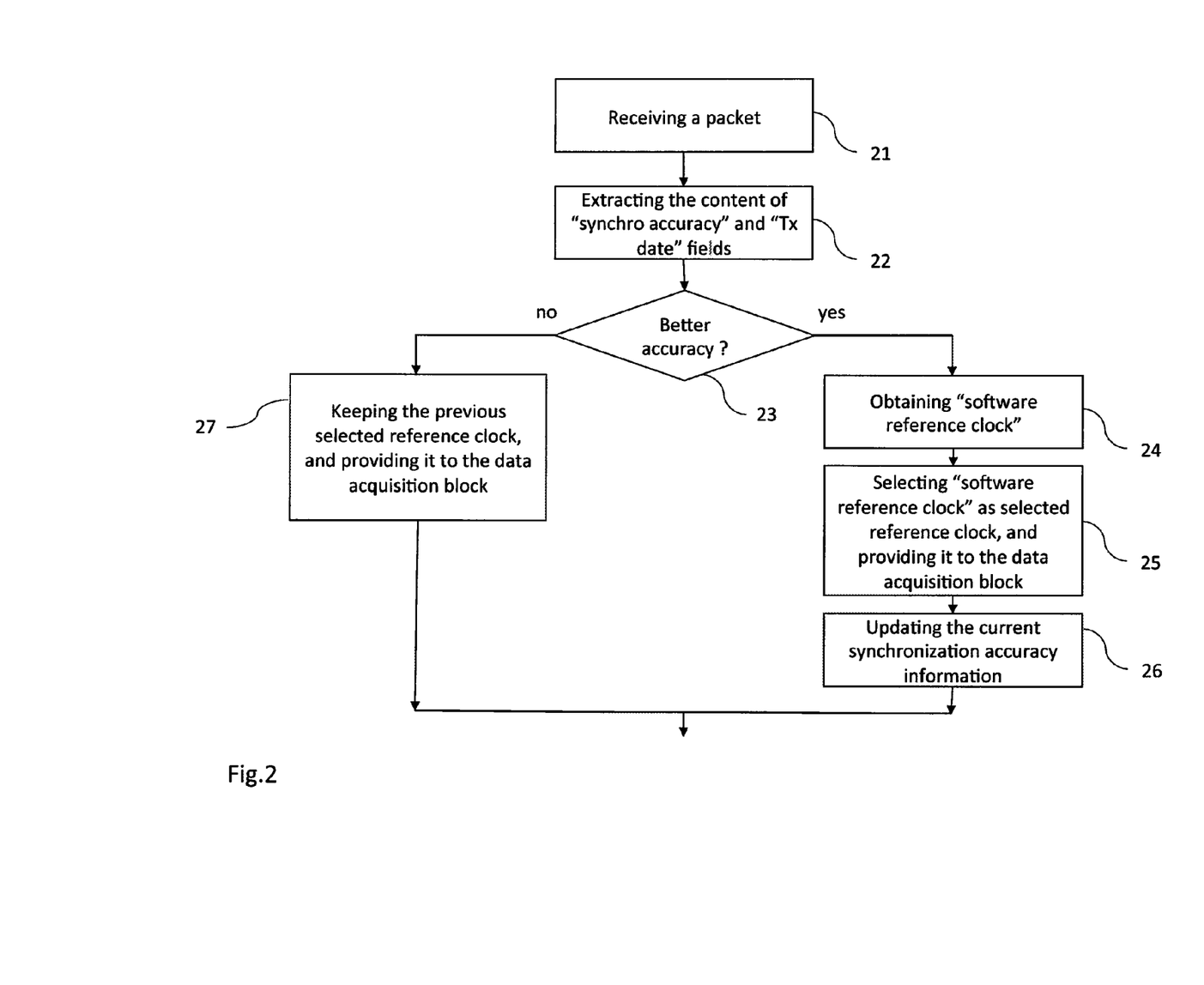
FIGS. 2 to 5 are flowcharts of a particular embodiment of the synchronization method according to the disclosure.

FIG. 2 details a first algorithm executed by a given wireless seismic acquisition unit 10, and more precisely by its controller 11.

In step 21, the controller 11 receives a packet (or message) from another device of the data acquisition system (e.g. a base station or another wireless seismic acquisition unit).

In step 22, the controller 11 extracts a synchronization accuracy information from the "Synchro Accuracy" field of the received packet, and a reference clock information from the "Tx Date" field.

In step 23, the controller 11 checks if the extracted synchronization accuracy information indicates a better synchronization accuracy than a current synchronization accuracy information associated to the given acquisition unit. If the synchronization accuracy information is a number of hops (particular embodiment mentioned above), "a better synchronization accuracy" means "a lower number of hops".

In case of positive answer in step 23, the controller 11 executes the following steps:

- step 24: obtaining the software reference clock 18 as a function of the extracted reference clock information (in an alternative embodiment, step 24 is executed between steps 22 and 23);
- step 25: taking the obtained software reference clock as the selected reference clock and providing it to the data acquisition block 14. For this purpose, the controller 11 manages the switching block 16, with the selection signal 19 ("Reference clock source selection"), in order to select the software reference clock 18; and
- step 26: updating the current synchronization accuracy information to indicate a lower synchronization accuracy than the extracted synchronization accuracy information. For example, increment the value of one unit if the extracted synchronization accuracy information is the number of hops.

In case of negative answer in step 23, the controller 11 executes a step 27, in which it keeps a previous selected reference clock 192 (i.e. either the software reference clock or the GNSS reference clock) and provides it to the data acquisition block 14.

Figure 3:
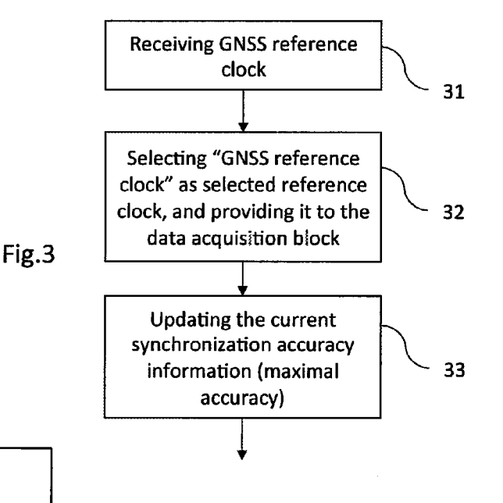

FIG. 3 details a second algorithm executed by the wireless seismic acquisition unit 10, and more precisely by its controller 11.

In step 31, the controller 11 receives, from the radio transceiver 12, the GNSS reference clock 17.

In step 32, the controller 11 manages the switching block 16, with the selection signal 19 ("Reference clock source selection"), in order to select the GNSS reference clock, and provide it (as the selected reference clock 192) to the data acquisition block 14.

In step 33, the controller 11 updates the current synchronization accuracy information to indicate a maximal synchronization accuracy. For example, it is updated with the value "0" if the extracted synchronization accuracy information is the number of hops.

Figure 4:
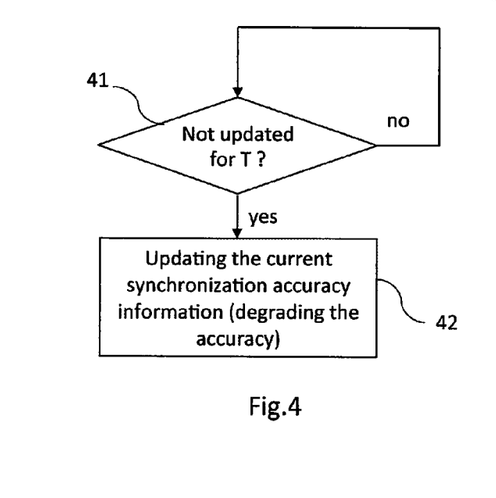

FIG. 4 details a third algorithm executed by the wireless seismic acquisition unit 10, and more precisely by its controller 11.

In step 41, the controller 11 checks if the current synchronization accuracy information has not been updated for a predetermined period of time T.

In case of positive answer in step 41, the controller 11 executes a step 42, in which it updates the current synchronization accuracy information, by degrading it.

For example, the predetermined period of time T depends on the frequency stability of a TCXO comprised in the wireless seismic acquisition unit 10. The frequency stability of a low cost and low power TCXO is typically 0.5 ppm but this may be reduced to 0.05 ppm if the TCXO frequency has been calibrated. In that case and if the extracted synchronization accuracy information is the number of hops, the current synchronization accuracy information is for example decreased every 20 seconds (by incrementing the value of one unit), which is equivalent to decrease a reference time accuracy of 1 μs every 20 seconds.

In case of negative answer in step 41, the controller 11 returns to step 41 for the next check.

Figure 5:
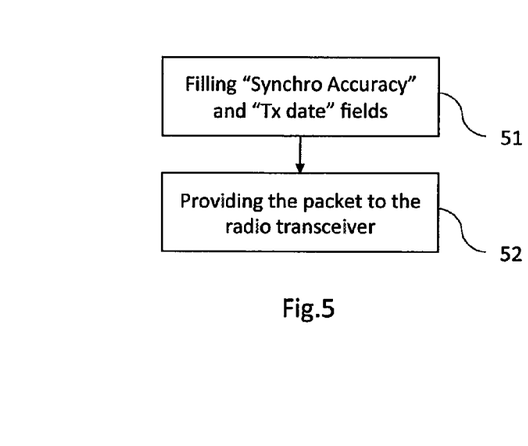

FIG. 5 details a fourth algorithm executed by the wireless seismic acquisition unit 10, and more precisely by its controller 11.

In step 51, for a given packet to be transmitted, the controller 11 inserts:
- in the "Synchro Accuracy" field 735, the updated current synchronization accuracy information resulting from the last updating step carried out (among steps 26 (FIG. 2), 33 (FIG. 3) and 42 (FIG. 4)); and
- in the "Tx Date" field 736, a reference clock information, relating to the currently selected reference clock resulting from the last selecting step carried out (among steps 25 (FIG. 2) and 32 (FIG. 3)).

In step 52, the controller 11 provides the given packet to the radio transceiver 12, which transmits it.

Figure 6A:
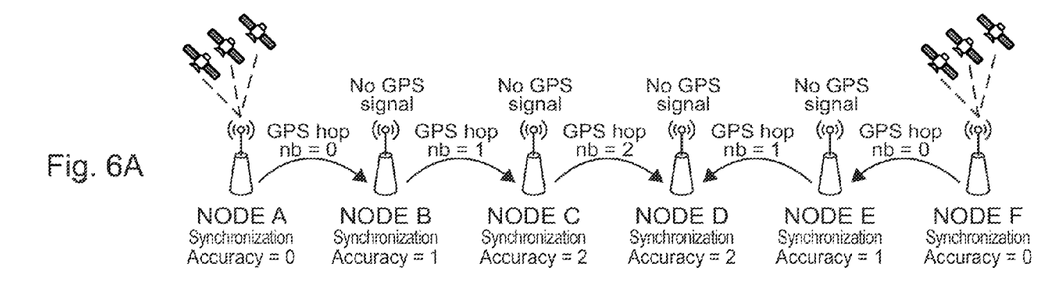
FIGS. 6A, 6B and 6C illustrate successive steps of an example of synchronization propagation in a multi-hop wireless seismic acquisition network according to a particular embodiment of the disclosure.
Figure 6B:
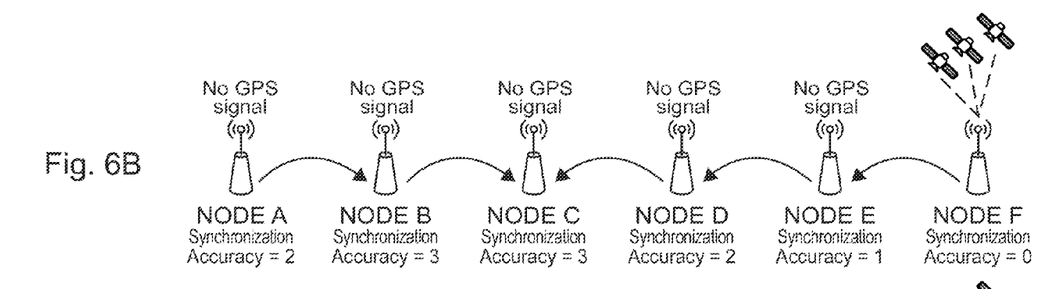
Figure 6C:
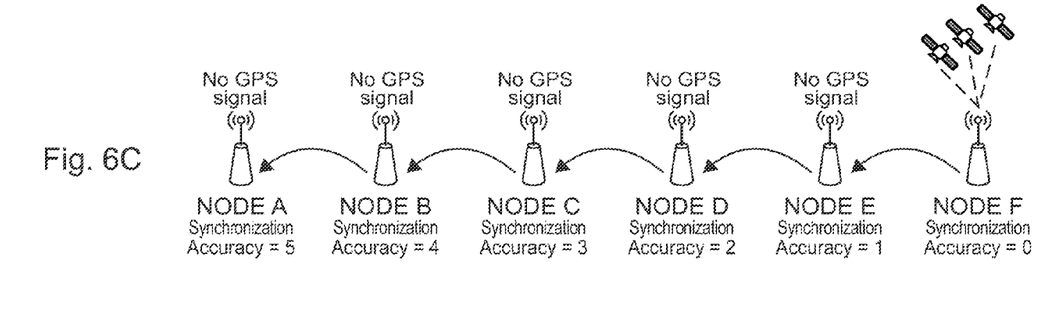

FIGS. 6A, 6B and 6C illustrate successive steps of an example of synchronization propagation in a multi-hop wireless seismic acquisition network according to a particular embodiment of the disclosure.

The nodes A, B, C, D, E and F are wireless data acquisition devices in a radio multi-hop network. These nodes have to be synchronized to GNSS time.

In this example, and as shown in FIG. 6A, it is assumed that a first instant the GNSS receivers of only nodes A and F have a fix (i.e. are able to provide the GNSS time). Thus nodes A and F are self-configured in Master Clock source, i.e. each of them selects the GNSS reference clock. The GNSS receivers of nodes B, C, D and E have no fix because of harsh environment, so these nodes need to get synchronization through their radio transceiver.

It is also assumed that every node sends broadcast packets, like "Hello" packet or unicast packets, regularly in the radio multi-hop network.

When a packet is transmitted by node A to node B, the "Synchro Accuracy" field of this packet is filled by node A with "0" (maximal accuracy value) and the "Tx Date" field is filled by node A with an estimated GNSS time value. Node B determines the GNSS time by processing the "Tx Date" field of the received packet, along with radio characteristics. Thus, node B is able to provide internally a software reference clock to its data acquisition block, based on the packet received from node A. Moreover, the current synchronization accuracy of node B is estimated to "synchronization accuracy of node A (i.e. the "Synchro Accuracy" field of the packet received from node A)"+1=1.

When a packet is transmitted by node B to node C, the "Synchro Accuracy" field of this packet is filled by node B with "1" and the "Tx Date" field is filled by node B with an estimated GNSS time value. Node C determines the GNSS time by processing the "Tx Date" field of the received packet, along with radio characteristics. Thus, node C is able to provide internally a software reference clock to its data acquisition block, based on the packet received from node B. Moreover, the synchronization accuracy of node C is estimated to "synchronization accuracy of node B (i.e. the "Synchro Accuracy" field of the packet received from node B)+1=2.

When a packet is transmitted by node C to node B, the "Synchro Accuracy" field of this packet is filled by node C with "2" and the "Tx Date" field is filled by node C with an estimated GNSS time value. Node B does not take into account the synchronization information ("Synchro Accuracy" field and "Tx Date" field) of this packet because its own current synchronization accuracy (=1) is better than the current synchronization accuracy of node C (=2).

When a packet is transmitted by node C to node D, the "Synchro Accuracy" field of this packet is filled by node C with "2" and the "Tx Date" field is filled by node C with an estimated GNSS time value. Node D does not take into account the synchronization information ("Synchro Accuracy" field and "Tx Date" field) of this packet because its own current synchronization accuracy (=2) is equal to the current synchronization accuracy of node C (=2).

In summary, in FIG. 6A, nodes B and C are synchronized to nodes A and B respectively. Nodes D and E are synchronized to nodes E and F respectively.

It is assumed that a second instant, node A loses fix (i.e. is no more able to provide the GNSS time) and, with time elapsing, it degrades its current synchronization accuracy.

When node A degrades its current synchronization accuracy to "1", then the current synchronization accuracies of nodes B and C become "2" and "3" respectively. Nodes B and C are still synchronized to nodes A and B respectively.

As shown in FIG. 6B, when node A degrades its current synchronization accuracy to "2", then the synchronization accuracy of node B becomes "3". Node C then changes its synchronization source by selecting node D, but the current synchronization accuracy of node C is still equal to "3".

Finally, and as shown in FIG. 6C, when node A degrades its current synchronization accuracy to "5", then node A changes its synchronization source which becomes node B. Nodes A, B and C are synchronized to nodes B, C and D respectively. The current synchronization accuracies of nodes A, B and C become 5, 4 and 3 respectively. Nodes D and E are still synchronized to nodes E and F respectively.

At least one embodiment of the disclosure provides synchronization technique in a data acquisition system, enabling each acquisition unit to easily choose a reference clock (i.e. a clock source) even though there are several possible reference clocks (i.e. several synchronization sources).

At least one embodiment of the disclosure provides a technique of this kind, which is more reliable in harsh environment than known systems based on only one synchronization source.

At least one embodiment of the disclosure provides a technique of this kind, which can be implemented in a multi-hop network.

At least one embodiment of the disclosure provides a technique of this kind, which can be implemented with, and provide synchronization redundancy to, an acquisition unit comprising or connected to a receiver (e.g. GNSS receiver or synchronization beacon receiver) providing a reference clock.

At least one embodiment of the disclosure provides a technique of this kind, which may be applicable to any wireless or cabled network of acquisition units.

Although the present disclosure has been described with reference to one or more examples, workers skilled in the art will recognize that changes may be made in form and detail without departing from the scope of the disclosure and/or the appended claims.

The invention claimed is:

1. A method for providing synchronization in a data acquisition system comprising a plurality of acquisition units, wherein a given acquisition unit of said plurality carries out the following steps:
   receiving a packet from another device of the data acquisition system;
   extracting a synchronization accuracy information and a reference clock information from the received packet;
   obtaining a first reference clock as a function of the extracted reference clock information;
   if the extracted synchronization accuracy information indicates a better synchronization accuracy than a current synchronization accuracy information associated to said given acquisition unit: taking the obtained first reference clock as a selected reference clock;
   and updating the current synchronization accuracy information to indicate a lower synchronization accuracy than the extracted synchronization accuracy information; and
   inserting in any packet to be transmitted the updated current synchronization accuracy information and a reference clock information relating to the selected reference clock.

2. The method according to claim 1, wherein, if the extracted synchronization accuracy information does not indicate a better synchronization accuracy than the current synchronization accuracy information, said given acquisition unit keeps a previous selected reference clock.

3. The method according to claim 1, wherein said given acquisition unit carries out the following steps:
   receiving, from a receiver comprised in or connected to said given acquisition unit, a second reference clock;
   taking the second reference clock as the selected reference clock; and
   updating the current synchronization accuracy information to indicate a maximal synchronization accuracy.

4. The method according to claim 3, wherein said receiver is a wireless receiver belonging to the group consisting of a satellite navigation system receiver and a synchronization beacon receiver.

5. The method according to claim 1, wherein said given acquisition unit carries out the following step: updating the current synchronization accuracy information, by degrading it, if it has not been updated for a predetermined period of time.

6. The method according to claim 1, wherein said given acquisition unit carries out the following supplemental step: providing the selected reference clock to a data acquisition block comprised in said given acquisition unit.

7. The method according to claim 1, wherein said another device, from which said given acquisition unit receives the packet, is another acquisition unit of said plurality or a base station.

8. The method according to claim 1, wherein the updated current synchronization accuracy information, inserted in the packet to be transmitted, depends on at least one parameter belonging to the group consisting of:
   a number of hops the packet has taken from an initial sending by a master clock source device till a resending by said given acquisition unit, within a multi-hop network comprising said master clock source device and said given acquisition unit; a current synchronization accuracy information associated to said another device from which said given acquisition unit has previously received said packet; radio characteristics of said packet received from said another device by said given acquisition unit; and
   a duration since a last previous packet received from said another device by said given acquisition unit.

9. The method according to claim 1, wherein said given acquisition unit is a device belonging to a multi-hop network comprising said plurality of acquisition units.

10. The method according to claim 1, wherein said given acquisition unit is a wireless device adapted to receive and transmit packets through a radio transceiver.

11. The method according to claim 1, wherein said plurality of acquisition units is a plurality of seismic acquisition units and said data acquisition system is a seismic data acquisition system.

12. A non-transitory computer-readable carrier medium storing a set of instructions that may be run by a computer in order to implement a method for providing synchronization in a data acquisition system comprising a plurality of acquisition units, wherein a given acquisition unit of said plurality carries out the following steps:
   receiving a packet from another device of the data acquisition system; extracting a synchronization accuracy information and a reference clock information from the received packet;
   obtaining a first reference clock as a function of the extracted reference clock information;
   if the extracted synchronization accuracy information indicates a better synchronization accuracy than a current synchronization accuracy information associated to said given acquisition unit:
   taking the obtained first reference clock as a selected reference clock; and updating the current synchronization accuracy information to indicate a lower synchronization accuracy than the extracted synchronization accuracy information; and
   inserting in any packet to be transmitted, the updated current synchronization accuracy information and a reference clock Information relating to the selected reference clock.

13. An acquisition unit comprising:
   means for receiving a packet from another device of the data acquisition system; means for extracting a synchronization accuracy information and a reference clock information from the received packet;

means for obtaining a first reference clock as a function of the extracted reference clock information; and the following means, activated if the extracted synchronization accuracy information indicates a better synchronization accuracy than a current synchronization accuracy information associated to said given acquisition unit:

means for taking the obtained first reference clock as a selected reference clock; and means for updating the current synchronization accuracy information to indicate a lower synchronization accuracy than the extracted synchronization accuracy information; and means for inserting in any packet to be transmitted, the updated current synchronization accuracy information and a reference clock information relating to the selected reference dock.

\* \* \* \* \*